United States Patent

[11] 3,555,234

[72] Inventors Vladimir Romanovich Lepp
Chapaevsky pereulok 14, kv. 121;
Jury Surenovich Seviev, ul. Marshala
Birjuzova 12, kv. 44; Ilya Samuilovich
Shapiro, Verkhne-Predtechensky pereulok
11, kv. 8; Boris Davydovich Beider,
Shelepikhinskoe shosse 3, kv. 11; Lev
Moiseevich Persits, Korovinskoe shosse 7,
korpus 1, kv. 24, all of Moscow, U.S.S.R.
[21] Appl. No. 718,171
[22] Filed Apr. 2, 1968
[45] Patented Jan. 12, 1971

[54] APPARATUS FOR PLASMA ARC METAL
MACHINING
7 Claims, 2 Drawing Figs.
[52] U.S. Cl. .................................................. 219/69,
219/121, 219/135
[51] Int. Cl. ...................................................... B23b 1/06,
B23k 9/10
[50] Field of Search ........................................... 219/69,
69(F), 68, 70, 131, 135, 121(P)

[56] References Cited
UNITED STATES PATENTS
2,862,099 11/1958 Gage ........................... 219/121(P)UX
Primary Examiner—R. F. Staubly
Attorney—Waters, Roditi Schwartz & Nissen ABSTRACT: Plasma arc machining of metals is effected by an apparatus which comprises a power system and an external working current feedback circuit. The power system includes a magnetic amplifier with magnetizing and demagnetizing windings to which is electrically connected a transformer and the windings of the magnetic amplifier are switched by a working current relay. The external working current feedback circuit includes a current transformer and a rectifier electrically connected to the demagnetizing winding of the magnetic amplifier. A control diode is connected in the external working current feedback circuit and the control circuit of the diode is connected to the rectifier through a self-contained DC source connected in opposition to the rectifier.

APPARATUS FOR PLASMA ARC METAL MACHINING

The invention relates to apparatus for plasma arc metal working and more specifically to apparatus for plasma arc cutting of metals.

At present, apparatus for plasma arc cutting of metals is widely used in industry as it effects a high-capacity and high-quality cutting process and is capable of cutting metal with a widely variable thickness.

Known in the art is an apparatus for plasma arc cutting of metal which comprises a control unit, and a power source including a transformer, a magnetic amplifier with magnetizing and demagnetizing windings, and an external working current feedback circuit comprising a current transformer and a rectifier.

The above apparatus is disadvantageous in that during the cutting process it is impossible to exercise stepless control and programming of the working current; the feedback circuit of the power source does not permit switching of the apparatus for manual cutting which requires a reduced idle running voltage.

An object of the present invention is to eliminate the above mentioned disadvantages.

A further object of the invention is to provide an apparatus for plasma arc cutting of metal which permits the cutting process to be effected both manually and automatically with the possibility of stepless control and programming of this process while insuring high operational capacity and good quality of the cut edges.

This object is attained by providing an apparatus for plasma arc metal working in which, according to the invention, the external working current feedback circuit includes a controlled diode whose control circuit is connected to the rectifier through a self-contained controllable DC source connected in opposition to the rectifier, whereas the control circuit of the magnetic amplifier is switched by the contacts of the working current relay.

For averaging pulsations and fluctuations of the working current, the control circuit of the controlled diode is provided with an integrating circuit consisting of a resistor and a capacitor.

For smoothly increasing the working current from an initial value to a predetermined value, the magnetizing winding of the magnetic amplifier is preferably provided with an RC circuit and is connected to the normally open contact of the working current relay; for smoothly increasing the working current during an automatic cutting operation the demagnetizing winding of the magnetic amplifier is advantageously connected to a circuit including a switch, the normally closed contact of the working current relay, a resistor, a capacitor and diodes.

The proposed apparatus helps to effect high-capacity plasma arc cutting of a metal body and ensures good quality of the cutting. The cutting process can be carried out both manually and automatically. The smooth increase of the working current at the beginning of the cutting completely eliminates formation of a dual arc thus increasing the resistance of the nozzle, improving the quality of the cut edges and increasing the capacity of the cutting process. The stepless control and programming of the working current during the cutting process helps to enlarge the technological facilities of the apparatus.

An embodiment of the invention will next be described in further detail with reference to the accompanying drawing, in which.

Figure 1:
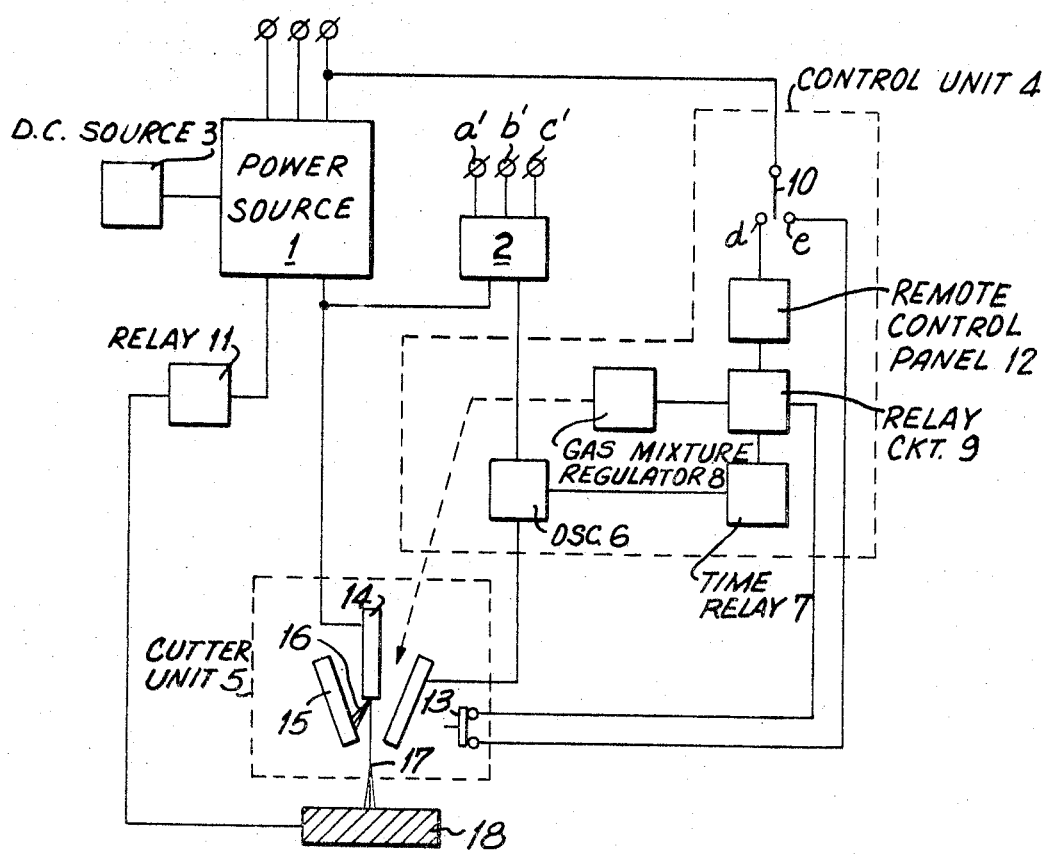
FIG. 1 is a block diagram of the apparatus, according to the invention.

The proposed apparatus (FIGS 1 and 2) comprises a power source 1 of a cutting arc, a power source 2 of a pilot arc, a DC source 3, a control unit 4 and a cutter unit 5. The control unit 4 includes an oscillator 6, a time relay 7, a device 8 to regulate the cutting gas mixture, a relay circuit 9, a switch 10, a working current relay 11. The apparatus is provided with a remote control panel 12 for controlling the automatic cutting, whereas a handle of the cutter unit 5 is equipped with a pushbutton 13 labeled for controlling the manual cutting.

The supply voltage is applied to the terminals $a$, $b$, $c$ of the cutting arc power source 1 and to the terminals $a^1$, $b^1$, $c^1$ of the pilot arc power source 2. The gas is fed from the unit 8 regulating the cutting gas mixture into the cutter unit 5 (in the drawing the gas path is shown by a dotted line). The cutter unit 5 comprises a nonconsumable electrode 14 and a current-carrying nozzle 15. A pilot arc 16 is started between the electrode 14 and the nozzle 15, whereas the cutting arc is maintained between the electrode 14 and the workpiece 18 being cut.

The cutting arc source 1 is a power system comprising a contactor 19, a power transformer 20 whose secondary winding 21 is delta connected during the manual cutting, and a magnetic amplifier 22 with a magnetizing control winding 23 and a demagnetizing control winding 24 (the origins of the windings are indicated as H and the ends as K). Control elements of the power source 1 includes a working current feedback circuit 25, a program demagnetizing circuit 26 energizing the winding 24 and a program magnetizing circuit 27 energizing the winding 23 represent the control elements of the power source 1.

Figure 2:
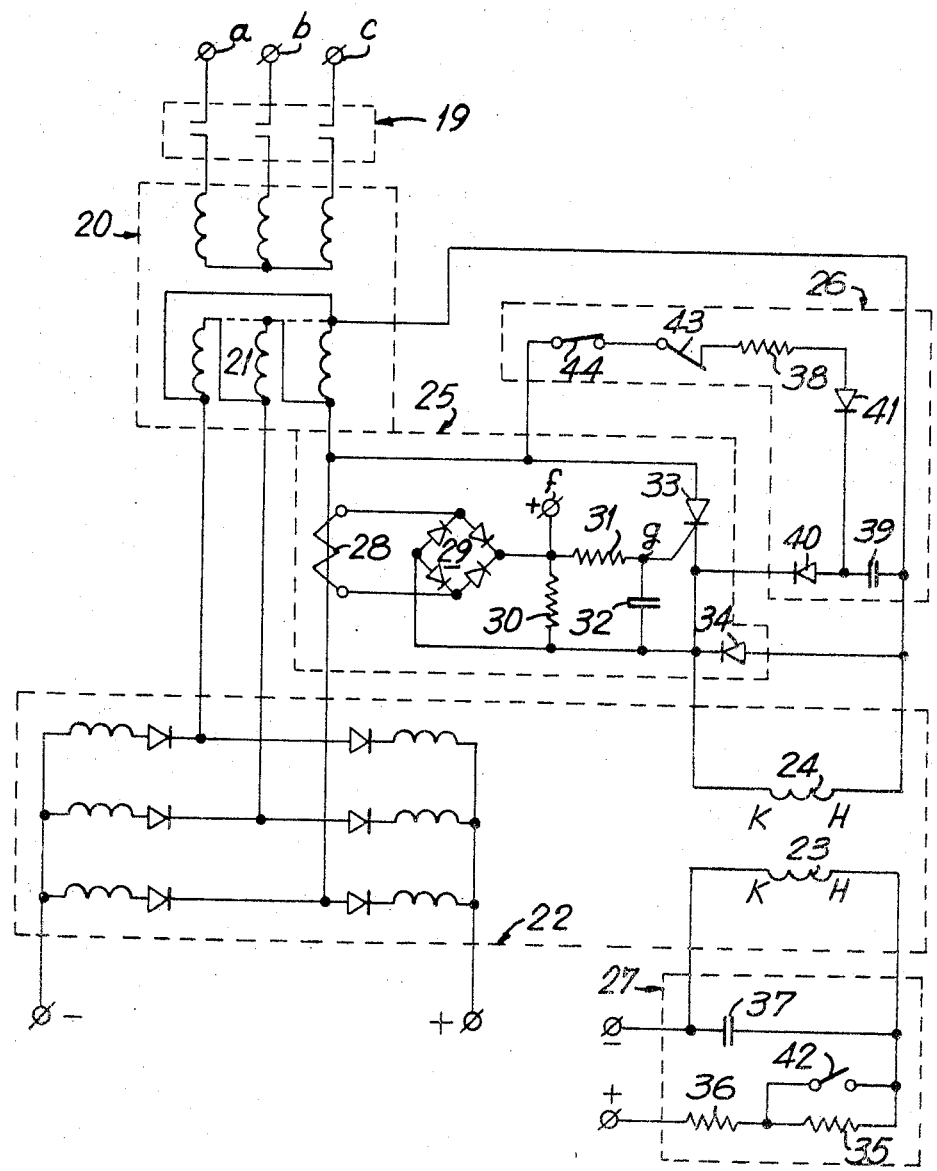
FIG. 2 is a circuit diagram of the power source in the case of a manual cutting operation according to the invention.

The working current feedback circuit 25 includes a current transformer 28, a bridge rectifier 29 loaded with a resistor 30, an integrating circuit consisting of a resistor 31 and a capacitor 32, a controlled semiconductor diode 33 and a semiconductor diode 34. The reference voltage from the self-contained controllable DC source 3 is applied to the terminals $f$, $g$ (FIG. 2). The program magnetizing circuit 27 consists of resistors 35, 36 and a capacitor 37. The program demagnetizing circuit 26 consists of a resistor 38, a capacitor 39 and semiconductor diodes 40, 41. The circuit 27 is switched by the contact 42 of the working current relay 11. The circuit 26 is switched by the contact 43 of the working current relay 11 when the switch 44 is closed.

During manual cutting the apparatus operates as follows.

The secondary winding 21 of the transformer 20 is connected in delta and the circuit including the resistor 38, capacitor 39 and diodes 41, 40 is opened by the switch 44. The switch 10 is set to the contact $e$ thus transfering the control of the apparatus to the pushbutton 13 mounted on the handle of the cutter unit 5. The composition and the consumption of the gas mixture needed for the cutting is regulated by the device 8. By depressing the pushbutton 13, the relay circuit 9 is put into operation which activates the gas supply and helps to clear the gas conduits. Simultaneously, the relay 7 is energized and after a predetermined time lag actuates the oscillator 6 striking the pilot arc 16. The pushbutton 13 also actuates the contactor 19 thus energizing the primary winding of the transformer 20.

By touching the workpiece 18 with the flame of the pilot arc 16 the cutting arc 17 is started.

The working current relay 11 of the cutting arc 17, when operated, by its contacts 42 shorts the resistor 35 thus smoothly increasing the current in the winding 23. The rise time is determined by the relationship between the values of the resistor 36 and capacitor 37. The rise of current in the winding 23 is followed by rising of the working current of the cutting arc 17 up to the operation of the feedback circuit 25. This happens as follows. The current of the secondary winding of the transformer 28 having been rectified in the bridge rectifier 29 produces a feedback voltage across the resistor 30, this voltage being proportional to the magnitude of the working current. The terminals $f$, $g$ of the resistor 31 are fed with a reference voltage in opposition to the feedback voltage. The sum effect of the feedback voltage and the reference voltage produces a current in the control circuit of the diode 33. Pulsations and possible fluctuations of this current are integrated by the resistor 31 and capacitor 32. Thus, the moment when the diode 33 is rendered conductive is determined by the magnitude of the reference voltage.

The current flowing through the conducting diode 33 is applied to the winding 24 in which it flows from the end to the origin of the winding and the magnetic amplifier is demagnetized. This stops further increase of the working current. When the diode 33 is rendered nonconductive, the diode 34 shorts the current of the winding 24 and the cutting is effected at a steady working current. If necessary, the working current is changed during the cutting process by varying the reference voltage applied to the terminals $f, g$.

In order to stop the cutting process, the pushbutton 13 is pressed for the second time. In this case the relay circuit 9 deenergizes the contactor 19. The cutting arc extinguishes, the circuit of the relay 11 is disconnected and the gas supply is stopped.

During automatic cutting, the secondary winding 21 of the transformer 20 is star connected. When operated, the switch 44 closes the circuit consisting of resistor 38, diodes 41, 40 and a capacitor 39. The switch 10 is set to the position $d$ transfering the control to the panel 12.

After the composition of the gas mixture has been established the above described operating cycle is started by pressing a corresponding pushbutton on the control panel 12. The initial reduction of the working current of the cutting arc 17 at the moment of the arc starting is effected by demagnetizing the magnetic amplifier 22 by winding 24. The current applied to the winding 24 through the closed contact of the relay 11, the resistor 38 and diodes 41, 40 flows in the winding from the origin H to the end K and demagnetizes the magnetic amplifier 22. At the same time, the capacitor 39 is charged. The demagnetizing current is set up by selecting the value of the resistance 38 so that the sum effect of the windings 23 and 24 provides the small initial current of the cutting arc 17. When starting the cutting arc 17, the relay 11 operates, breaking the circuit 26 through the contacts 43 and shorting the resistor 35 through the contact 42. The demagnetizing current flowing through the winding 24 drops smoothly due to discharge of the capacitor 39 while the magnetizing current in the winding 23 increases as in the case of manual cutting. The current of the cutting arc accordingly rises to a predetermined value. As the action of the feedback is determined only by the current of the cutting arc 17 and by the reference voltage applied to the terminals $f$ and $g$ the feedback circuit needs no switching and operates similarly both for manual and automatic cutting.

As the magnitude of the steady current of the cutting arc 17 depends on the value of the reference voltage applied to the terminals $f$ and $g$ the proposed apparatus provides stepless control of the working current of the cutting arc 17.

Furthermore, it is possible to program the working current of the cutting arc 17 during the cutting process by properly changing the reference voltage applied to the terminals $f, g$ The above described apparatus can be used for other kinds of plasma arc metal working operations such as welding, deposition, etc.

We claim:

1. An apparatus for plasma arc machining of metals comprising: a power system and an external working current feedback circuit, said power system including a magnetic amplifier with magnetizing and demagnetizing windings, a transformer electrically connected with said magnetic amplifier, and a working current relay for switching said windings of the magnetic amplifier; said external working current feedback circuit including a current transformer and a rectifier, and being electrically connected to said demagnetizing winding; a controlled diode with a control circuit in said external working current feedback circuit, and a self-contained DC source, the control circuit for said diode being connected to said rectifier through said self-contained DC source which is connected in opposition to said rectifier.

2. An apparatus as claimed in claim 1, in which the control circuit for the controlled diode includes an integrating circuit consisting of a resistor and a capacitor for averaging pulsations and fluctuation of the working current.

3. An apparatus as claimed in claim 1, comprising an RC circuit, the magnetizing winding of the magnetic amplifier being connected to said RC circuit and the normally-open contacts of the working current relay for providing smooth increase of the working current from an initial to a predetermined value.

4. An apparatus as claimed in claim 2, comprising an RC circuit, the magnetizing winding of the magnetic amplifier being connected to said RC circuit and the normally open contacts of the working current relay for providing smooth increase of the working current from an initial value to a predetermined one.

5. An apparatus as claimed in claim 1, comprising a circuit connected to the demagnetizing winding of the magnetic amplifier comprising a switch, the normally closed contacts of the working current relay, a resistor, at least two diodes and a capacitor for providing smooth increase of the working current during automatic cutting.

6. An apparatus as claimed in claim 2, comprising a circuit connected to the demagnetizing winding of the magnetic amplifier comprising a switch, the normally closed contacts of the working current relay, a resistor, at least two diodes and a capacitor for providing stepless control of the working current during automatic cutting.

7. An apparatus as claimed in claim 3, comprising a circuit connected to the demagnetizing winding of the magnetic amplifier comprising a switch, the normally closed contacts of the working current relay, a resistor, at least two diodes and a capacitor for providing stepless control of the working current during automatic cutting.